Patented Feb. 26, 1952

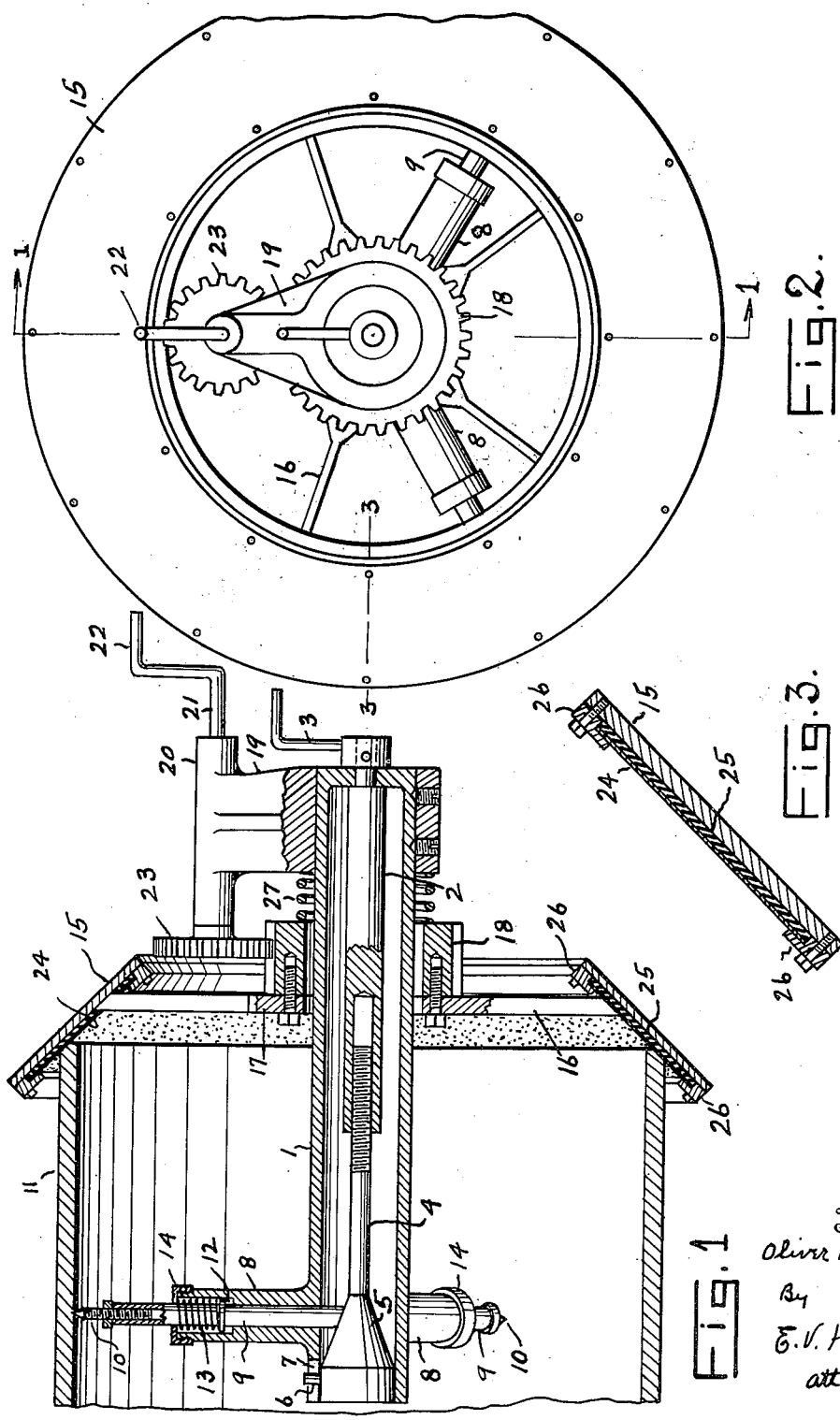

2,587,398

UNITED STATES PATENT OFFICE 2,587,398

PIPE END FINISHING MACHINE

Oliver R. Smith, Fort Worth, Tex.

Application March 11, 1949, Serial No. 80,821

5 Claims. (Cl. 51—241)

1

The machine has been specially designed for preparing the ends of pipe sections which are to be welded together. In welding pipe sections in alignment it is common practice to bevel the adjacent ends of the sections so that when the ends are brought together and into alignment there will be a groove around said ends to receive the welding material; also prior to the welding it is desirable that the beveled portions of the sections be cleansed of all rust or foreign matter. The machine herein described has been provided for cleansing and conditioning the ends of the pipe sections.

It is a further object of the present invention to provide a machine of the character described having a supporting frame which may be partially inserted into the pipe with means for readily centering the tool relative to the pipe so that the beveled end of the pipe may be conditioned for welding.

Other objects and advantages will be apparent from the following specification which is illustrated by the accompanying drawings, wherein:

Figure 1 is a side elevation of the machine partly in section taken on the line 1—1 of Figure 2.

Figure 2 is an end elevation, and

Figure 3 is a sectional view taken on the line 3—3 of Figure 2.

Referring now more particularly to the drawings wherein like numerals of references designate the same parts in each of the figures, the numeral 1 designates a tubular support whose inner end is open and whose outer end is closed.

Mounted axially in the support there is a shaft 2 whose outer end is reduced and fits through an axial bearing in the outer end of the support and secured, in approved manner, on this reduced outer end there is a crank 3 by means of which the shaft may be turned.

The inner end of the shaft 2 is internally threaded and one end of the expander shaft 4 is threaded into the adjacent end of the shaft 2 and secured on the other end of the shaft 4 there is a conical shaped expander 5 which is movable with the shaft 4 longitudinally of the support but is maintained against rotation by means of a pin 6 which is fixed to the expander and which is movable in a longitudinal slot 7 in the support.

Therefore, by rotating the shaft 2 by means of the crank 3 the shaft 4 and expander 5 may be moved longitudinally of the support 1.

The inner end of the support 1 has the radiating cylinders 8 secured thereto in any preferred manner, three of said cylinders being shown.

In the cylinders 8 there are the anchor rods 9 which are adjustable axially relative to the cylinders. The inner ends of these rods 9 are tapered to conform to the taper of the expander 5, as shown in Figure 1, and threaded into the outer ends of the rods 9 are the pipe anchors 10 whose outer ends are pointed to readily engage

2 the inner wall of the pipe, as 11, into which they are inserted.

Upon rotation of the crank 3 in one direction the shaft 4 and the expander will be moved in the direction indicated by the arrow in Figure 1 and the expander will force the rods 9 outwardly thus engaging the anchors 10 with the inside of the pipe so as to securely anchor the machine relative to the pipe.

Each rod 9 is provided with a spring seat 12 therearound and a spring 13 surrounds said rod and is seated on said seat with its outer end in contact with a cap 14 which is screwed onto the outer end of each cylinder 8. The springs 13 are maintained under compression so that when the crank 3 is rotated in the other direction so as to move the shaft 4 and expander 5 in a direction opposite to that indicated by the arrow in Figure 1 and the expander is released from the inner ends of the rods 9 said rods and the pipe anchors 10 will be moved radially inwardly under the influence of said springs so as to clear the pipe in order that the machine may be removed from the pipe.

There is a tapering grinding wheel 15 which is provided with radial spoke 16 whose outer ends are secured to said wheel and whose inner ends are secured to an annulus 17. This annulus surrounds and is spaced from support 1 and secured to the outer side thereof there is a gear wheel 18.

Fixed on the outer end of the support 1 and, preferably, detachably secured thereto, there is a frame 19 which upstands from said support and whose upper end is formed with an elongated bearing 20 in parallel relation with said support and in which a crank shaft 21 is mounted to rotate. The outer end of this crank shaft has a crank arm 22 thereon by means of which said shaft may be rotated and fixed on the inner end of the shaft 21 there is a gear wheel 23 which is in mesh with the gear wheel 18 and by means of which said gear wheel and the grinding wheel 15 may be rotated.

The pitch of the grinding wheel 15 is substantially the same as the pitch of the adjacent end of the pipe section 11. The inner face of the grinding wheel 15 is covered by an abrasive surface 24 such as sand paper, or the like, and which is backed by a layer 25 of resilient material such as rubber. The abrasive material and the rubber backing are clamped to the operative face of the wheel 15 by means of annular inside clamps, such as 26, 26, which are clamped to the wheel 15 by suitable set bolts and whose inner margins overlap, the corresponding margins of the abrasive material, as illustrated clearly in Figure 2.

In application the machine is assembled, as shown in Figure 1, and inserted into the pipe until the abrasive surface of the wheel 15 comes into contact with the beveled face to be cleansed and finished. The support 1 may be forced inwardly to place the spring 27 under compression. This spring surrounds the support 1 between the frame 19 and the gear wheel 18 and when the machine is anchored in place the abrasive surface will be held yieldingly against the tapering face to be cleansed and finished.

When the machine is applied to the pipe, as above stated, and inward pressure is applied to place the spring 27 under the required compression the crank 3 is then turned in an anti-clockwise direction to move the shaft 4 in the direction indicated by the arrow in Figure 1 so as to force the rods 9 outwardly until the anchors 10 engage securely with the inner wall of the pipe 11. The machine will thus be anchored to the pipe in position to operate and the spring 27 will be maintained under compression. If the pipe 11 is out of round the anchors 10 may be adjusted so that all of the anchors will contact with the pipe wall at the same time. The crank 22 is then rotated in either direction and the abrasive surface in contact with the tapering face of the pipe will cleanse and finish said tapering surface and will be maintained yieldingly thereagainst by the resilient support 25 for said friction surface as well as by the compression spring 27 and the operation may continue for the required length of time to prepare the pipe end for welding.

The drawings and description are illustrative merely while the broad principle of the invention will be defined by the appended claims.

What I claim is:

1. A finishing machine comprising, a tubular support, aligned shafts mounted axially on the support and having a threaded connection, an expander on one of the shafts, means for rotating the other shaft, radial cylinders on the support, rods mounted to move axially in the cylinders, pipe engaging means on the outer ends of said rods and the inner ends of said rods being in operative relation with the expander, a tapering grinding wheel around the support having an inside abrasive surface, a gear wheel mounted for longitudinal movement with relation to the support and connected with said grinding wheel, a frame secured to the support, means mounted on the frame and geared to said gear wheel for rotating same and including a crank through which said rotating means may be actuated.

2. A finishing machine comprising, a tubular support, aligned shafts mounted axially on the support and having a threaded connection, an expander on one of the shafts, means for rotating the other shaft, radial cylinders on the support, rods mounted to move axially in the cylinders, pipe engaging means on the outer ends of said rods and the inner ends of said rods being in operative relation with the expander, a tapering grinding wheel around the support having an inside abrasive surface, a gear wheel encircling the support and movable longitudinally thereof and connected with said grinding wheel, a frame secured to the support, means mounted on the frame and geared to said gear wheel for rotating same and including a crank through which said rotating means may be actuated, and a yieldable element between said frame and gear wheel and normally under compression.

3. A pipe end finishing machine comprising, a tubular support, aligned shafts mounted axially in the support and having a threaded connection, an expander on one of the shafts, means for rotating the other shaft, radial cylinders on the support, rods mounted to move axially in the cylinders, pipe engaging means on the outer ends of said rods engageable with the inside of said pipe to hold said support against rotation therein, the inner ends of said rods being in operative relation with the expander, a tapering grinding wheel around the support having a resiliently mounted inside abrasive surface, a gear wheel encircling the support and movable longitudinally relative thereto and connected with said grinding wheel, a frame secured to the support, means mounted on the frame and geared to said gear wheel for rotating same and including a crank through which said rotating means may be actuated.

4. A pipe end finishing machine comprising, a tubular support, aligned shafts mounted axially on the support and having a threaded connection, an expander on the other shaft, radial cylinders on the support, rods mounted to be moved axially in the cylinders by the expander outwardly, means arranged to move the rods inwardly upon release of the expander from the rods, adjustable pipe engaging means on the outer ends of said rods, a grinding wheel around the support having an abrasive surface resiliently mounted thereon, a gear wheel around the support and longitudinally movable relative thereto and connected with said grinding wheel, a frame secured to the support, means mounted on the frame and geared to said gear wheel for rotating same and including means through which said rotating means may be actuated, and a yieldable element between said frame and gear wheel and normally under compression for holding the abrasive surface yieldingly in contact with the work.

5. A pipe end finishing machine comprising, a tubular support, aligned shafts mounted axially on the support and having a threaded connection, an expander on one of the shafts, means for rotating the other shaft, radial cylinders on the support, rods mounted to be moved outwardly axially of the cylinders by the expander, adjustable anchors on the outer ends of said rods engageable with the inside of said pipe upon outward movement of said rods for anchoring said support against rotation in the pipe, a tapering grinding wheel around the support having an inner supporting face, a resilient backing mounted on said face, abrasive material on said backing, a gear wheel around the support and movable longitudinally relative thereto and connected with said grinding wheel, a frame secured to the support, means mounted on the frame and geared to said gear wheel for rotating the same and including means through which said rotating means may be actuated, and a yieldable element between said frame and gear wheel and normally under compression for holding the abrasive yieldingly in contact with the work.

OLIVER R. SMITH.

REFERENCES CITED

The following references are of record in the file of this patent:

UNITED STATES PATENTS

| Number | Name | Date |
|---|---|---|
| 1,196,208 | Mahoney | Mar. 10, 1931 |
| 2,180,640 | Mikalson | Nov. 21, 1939 |
| 2,338,484 | Beverlin | Jan. 4, 1944 |
| 2,363,102 | Wachowitz | Nov. 21, 1944 |
| 2,414,731 | Forbes | Jan. 21, 1947 |